United States Patent [19]
Kodama et al.

[11] Patent Number: 5,283,086
[45] Date of Patent: Feb. 1, 1994

[54] PLASMA TREATMENT OF POLYMER POWDERS

[75] Inventors: Jun Kodama, Aso, Japan; Renate Foerch, Oestrich-Winkel, Fed. Rep. of Germany; N. Stewart McIntyre; George S. P. Castle, both of London, Canada

[73] Assignees: The University of Western Ontario, London; I.C.S.T., The Institute For Chemical Science and Technology, Sarnia, both of Canada; Fujitsu Limited, Kawasaki, Japan

[21] Appl. No.: 995,990

[22] Filed: Dec. 23, 1992

[51] Int. Cl.⁵ .............................................. B05D 3/06
[52] U.S. Cl. ................................... 427/576; 427/569; 427/222; 427/296
[58] Field of Search ................ 427/569, 576, 222, 296

*Primary Examiner*—Bernard Pianalto
*Attorney, Agent, or Firm*—R. Craig Armstrong

[57] ABSTRACT

Surfaces of fine polystyrene (PS) and polymethyl methacrylate (PMMA) powders were modified by exposure to the downstream products of a nitrogen or oxygen microwave plasma. The effects of nitrogen and indium incorporation in the powder surface were studied with emphasis on variations in the triboelectric properties of the powder. X-ray photoelectron spectroscopy (XPS) was utilized to determine the changes in surface elemental composition. After nitrogen plasma treatment, the C 1s peak profiles suggested the formation of amines in the case of PS, and the formation of imines and amides in the case of PMMA. Oxygen plasma treatment suggested the formation of hydroxyl and carbonyl groups on the surfaces of both PS and PMMA. After treatment with a nitrogen or oxygen plasma, the charge-to-mass ratio (Q/M) of PS and PMMA powders in contact with carrier particles was measured using the cage blowoff method. The surface charge density (Q/A) was calculated from Q/M. The Q/A of nitrogen plasma-treated PS powder was seen to shift towards positive charge with small increases in the nitrogen concentration. The Q/A of oxygen plasma treated PS powder initially shifted toward negative charge, but changed towards positive charge with higher oxygen concentrations. Plasma-treated PMMA powder showed a different behaviour and the variation of Q/A on PMMA was much less than that of PS. Results suggest that triboelectrification of the polymer powder may be related to changes in the electrical surface states, and that nitrogen may act as a group V dopant within the PS surface.

5 Claims, 12 Drawing Sheets

PLASMA TREATMENT OF POLYMER POWDERS

BACKGROUND OF THE INVENTION

This invention relates to the charging of materials by triboelectrification, especially the fine polymer powders used as toners in electrophotographic systems.

The charging of materials by triboelectrification has been applied to a number of industrial products for some time. Since the invention of the electrophotographic technique used for copiers and non-impact printers by Carlson in 1938 (see U.S. Pat. No. 2,297,691 (Carlson, 1942)), the field has developed into a large commercial market. Recently, electrophotography has required higher resolution images than was necessary previously, for application in colour image systems (see E. Czech, W. Ostertag, SPIE 1253, *Hard Copy and Printing Products*, 64, (1990)). For this purpose it is very important to control accurately the electrical charge of the fine polymer powders used as toners in electrophotographic systems (see S. Kume, *The Institute of Electrostatics of Japan* 10(5), 306 (1986)).

Toners are fine polymer particles typically about 10 μm in diameter mixed with various additives and usually include a coloured dye. In a two-component development system, the toner particles are charged by making contact with larger metal beads known as carriers [see L. B. Schein, "Electrophotography and Development Physics", ISBN 3-see 540-18902-5, Springer Verlag (1988)]. The toner is transferred to the photoreceptor due to an attractive electric field to form a real image (development). For a high quality image, it is important to control the charge-to-mass ratio (Q/M) of the toner within predetermined limits. The Q/M varies with changes in environmental conditions and surface properties of the toner (see N. Matsui, K. Oka and Y. Inaba, *J. Electrophotographics* 30(3), 282 (1991)). Much work has been done to investigate the triboelectrification of fine polymer powders (see J. Henniker, *Nature* 196, 474 (1962); C. B. Duke and T. J. Fabish, *J. Appl. Phys.* 49, 315 (1978); and L. B. Schein and M. Latta, *J. Appl. Phys.* 69 (10), 6817 (1991)), but the mechanisms are still not fully understood. Some investigations suggest that the nature of the chemical species on the surface is the most important aspect for controlling the triboelectric charge of the particle (see I. Shinohara, F. Yamamoto, H. Anzai, and S. Endo, *J. Electrost.* 2, 99 (1976), and H. W. Gibson, *Polymer* 25, 3 (1984)).

SUMMARY OF THE INVENTION

There is a need to improve the understanding of the relationship between the surface elemental composition and the mechanism of surface electrification on polymer powders, and the present invention has improved that understanding. Nitrogen or indium have been incorporated into the surface structure of polymer powders using a downstream microwave plasma reactor. After this incorporation each of the elements was found to increase and stabilize the Q/M. A model to explain the changes in the electrification properties is suggested.

Moreover, there is a need to improve the triboelectric properties of polymer powder, and the invention provides a method for doing so, comprising the step of positioning the polymer powder in the afterglow region of a gas plasma having a main region and an afterglow region, where the gas plasma is in a low-pressure stream of a gas selected from the group consisting of oxygen, nitrogen, and gases containing oxygen or nitrogen, whereby low concentrations of oxygen or nitrogen as the case may be are incorporated into the surface of the powder.

Preferably, the polymer powder is of any conjugated polymer, or a polymer bearing aromatic constituents.

Preferably, the gas is nitrogen, and the polymer is polystyrene or co-polymers of polystyrene.

Alternatively, the method comprises the step of positioning the polymer powder in the afterglow region of a gas plasma having a main region and an afterglow region, where the gas plasma is in a low-pressure stream of a gas selected from the group consisting of oxygen, nitrogen, and gases containing oxygen or nitrogen, and where indium as a metal foil is suspended in the gas stream adjacent the gas plasma, thereby generating indium vapour, whereby low concentrations of indium are incorporated into the surface of the powder.

BRIEF DESCRIPTION OF THE DRAWINGS

The invention will be described with reference to the accompanying drawings, in which.

DETAILED DESCRIPTION OF THE INVENTION

1. EXPERIMENTS

Figure 1:
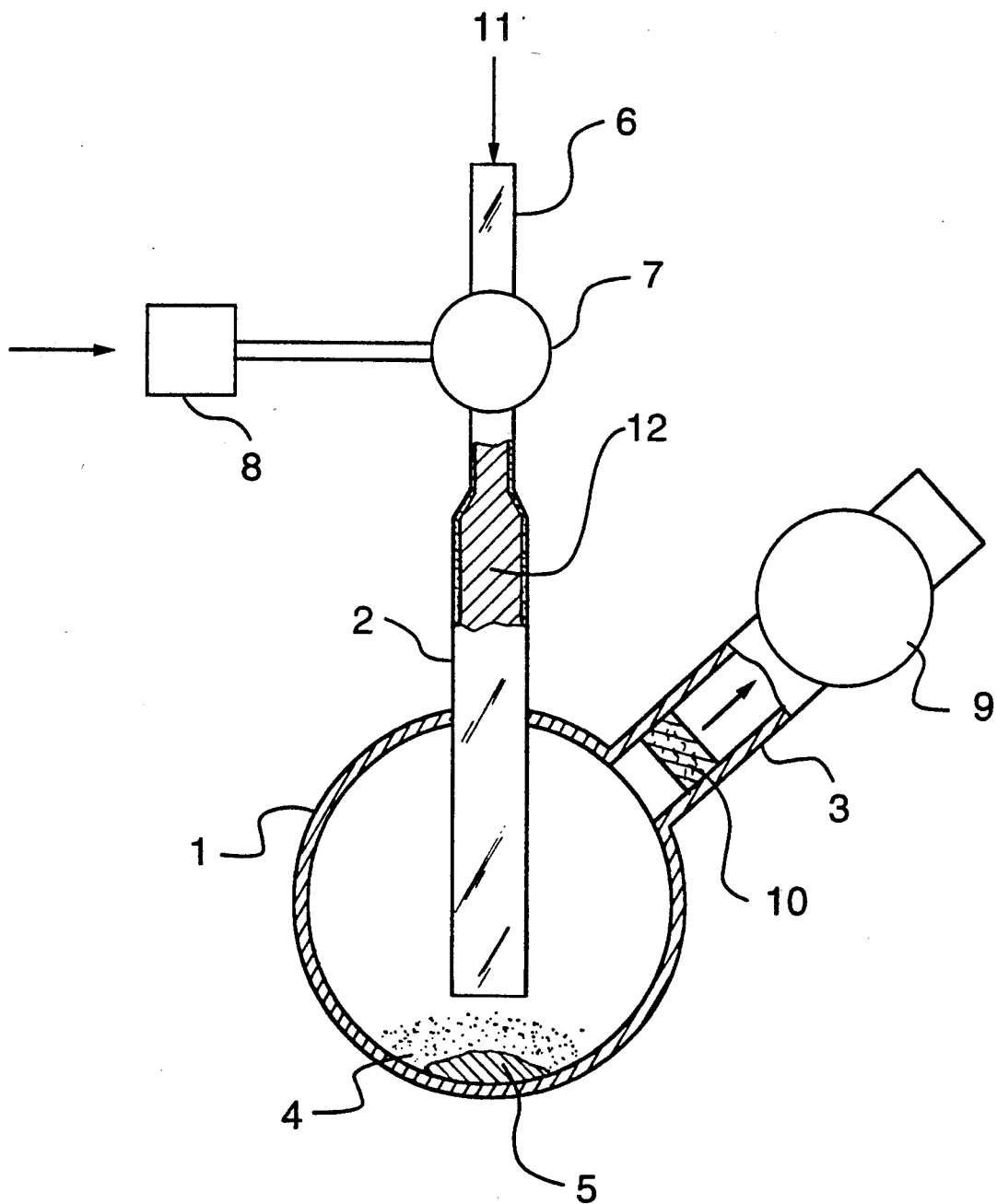
FIG. 1 is a schematic of the plasma reactor for powder treatment.

Polystyrene (PS) and polymethyl methacrylate (PMMA) powders in the form of small spherical beads were obtained from Sekisuikaseihin Co., (Tokyo, Japan). The XPS analysis was performed using an SSX-100 X-ray photoelectron spectrometer which utilizes monochromatized Al Kα X-rays for excitation of the sample. For analysis, the polymer sample was fixed on indium foil (5×5 mm², 0.5 mm thickness) in a sample holder. For the elemental broad scan analysis, the X-ray spot size was set to 600 μm. The elemental broad scan was measured at the three different spots to ensure even and overall treatment of the powder. For high resolution analysis of the C 1s peak, the X-ray spot size was reduced to 150 μm. The charging of the polymer surface during X-ray exposure was controlled using the flood gun/screen technique (see C. B. Bryson, *Surface Sci.* 189/190, 50 (1987)). Binding energies have been corrected for the shifts observed due to sample charging and spectra are referenced to the C 1s hydrocarbon component which was assigned the value of 284.8 eV (see ASTM Standard, E1015, Vol. 03.06 (1984)).

Atomic percentages of oxygen and nitrogen were calculated using Scofield cross-sections correlated for differences in inelastic mean free path due to electron kinetic energy. The inelastic mean free path for C 1s electrons in PS was taken to be 2.9 nm (see R. F. Roberts, D. L. Allara, C. A. Pryde, D. N. E. Buchanan, and N. D. Hobbins, *Surface and Interface analysis* 2(1), 5 (1980)). The atomic percentages of nitrogen and oxygen were converted into relative quantities as N/C (nitrogen/carbon atom ratio) or O/C (oxygen/carbon atom ratio).

XPS showed the original PS powder (mass mean diameters of 8, 15, and 20 μm) to contain some oxygen O/C=0.03±0.01 on the surface. This oxygen is thought to be the result of oxidation during processing. PMMA powder (mass mean diameters of 8, 12, and 20 μm) showed oxygen O/C=0.35±0.01 on the surface. Since the properties of the powder surfaces change with atmospheric conditions (see Y. Nurata, *Hyomen* 23 (9), 528 (1985); K. P. Homewood, *J. Electrostat.* 10, 299 (1981)), it is important to control these conditions.

Surface treatment of the powders was carried out in a vortex reactor located downstream from a microwave plasma discharge. The vortex reactor used during this work (FIG. 1) consisted of a 100 ml pyrex flask 1 with upper and side necks 2 and 3 respectively. The powder samples 4 were placed in the bottom in the flask along with a pyrex covered magnetic stirrer 5. The amount of powder sample used for each experiment was 0.3–1.2 g. The reactor was connected to the plasma by a 1.5 cm diameter quartz tube 6 fitted into the upper neck 2 of the flask. The upper part of this tube was surrounded by an Evenson microwave cavity 7 connected to a 120 W, 2.45 GHz microwave generator 8. The side neck 3 of the flask was connected to a high volume one stage rotary pump 9 with a pumping speed of $\approx 1.1 \times 10^6$ sccm (standard cubic centimeters per minute). A fine cloth filter 10 was placed between the reactor and pump to prevent loss of powder to the pump.

Pure nitrogen gas (99.99%) and pure oxygen gas (99.99%) were used as plasma source gases, introduced via a gas inlet 11. After the reactor was pumped to an initial base pressure of $5 \times 10^{-2}$ torr, the gas flow was typically set at a low flow rate (40 sccm) or at a high flow rate (O₂; 1600 sccm, N₂; 2000 sccm) for the experiments. The gas flow rates were controlled by a mass flow controller (not shown). The pressures in the reactor were 1.0 torr (at 40 sccm), 3.5 torr (at 1600 sccm), and 5.0 torr (at 2000 sccm). The net microwave power for the experiments was set at 40 W. Treatment times were controlled and varied between 5 min and 30 min.

In the above described configuration the sample is located $\approx 16$ cm downstream from the plasma, and is therefore exposed only to the longer lived species in the plasma afterglow region 12. Downstream plasma treatment of polymer surfaces has previously been studied [see R. Foerch, J. Izawa, and N. S. McIntyre, *J. Polymer Sci.: Appl. Polymer Symposium* 46, 415 (1990)] and it has been shown that the efficiency of the treatment is dependent on the gas flow rate, the microwave power applied and the distance of the sample from the plasma (see R. Foerch, N. S. McIntyre, R. N. S. Sodhi, and D. H. Hunter, *J. Appl. Polymer Sci.* 40, 1903 (1990), and R. Foerch, N. S. McIntyre, and D. H. Hunter, *J. Polymer Sci., Part A, Polymer Chemistry* 28, 193 (1990)).

In downstream plasma treatment, the reactive species of a gas plasma are reacted with a sample positioned a distance beyond the main plasma region, i.e. downstream from the main plasma region in terms of the direction of gas flow. The actual distance could vary from installation to installation. This is known as downstream or remote plasma modification, the main application of which to date has been in the electronics and semiconductor industry for the purpose of deposition of dielectric coatings on semi conductor devices or the cleaning of polymers (see Bachman U.S. Pat. No. 4,946,549).

The downstream or remote plasma treatment in the present invention provides a much less destructive method for polymer treatment in comparison to direct plasma modification and other more commonly used methods such as corona discharge, ozone and flame treatment. In addition, the remote plasma treatment enables greater control over the reactive species interacting with the polymer, such that only the longer lived species, i.e. N atoms, reach the sample, rather than a whole range of electrons, ions and other excited species.

The cage blowoff method is a simple and reproducible method for measuring the charge-to-mass ratio (Q/M) of polymer powders in contact with carrier particles (see L. B. Schein and J. Cranch, *J. Appl. Phys* 46, 5140 (1975). The carrier particles were made of polymer-coated ferrimagnetic particles, with a diameter of 120 μm. The plasma treated samples were mixed with the carriers in a 30 ml glass bottle. The ratio of the quantity of sample to carrier was changed with the diameter of the sample powders to ensure the same initial ratio of sample surface area to carrier surface area (0.5:1) (see N. Hoshi and M. Anzai, *J. Electrophotographics* 25 (4), 269 (1986). Thus, for a typical powder diameter of 8 μm, the mixing ratio of sample to carriers was 2.0 wt %, while for 20 μm the ratio was 4.5 wt %. A mixing time of 30 minutes at 120 rpm was utilized to electrify the samples sufficiently.

After the mixing, the sample/carrier mixture was transferred to a double-walled aluminum Faraday cage (the "blowoff cage") with 44 μm metal mesh covering both ends of the inner container. The smaller powder particles were blown through the screen using a strong jet of air. The charge remaining on the carrier beads was measured using a Keithley Model 602 electrometer. This charge measured is equal and opposite to the charge on the powder. The change in mass before and after the blowoff was measured using a balance with an accuracy of ±0.1 mg. This data allowed Q/M to be calculated. Q/M measurements were repeated three times on different samples from the same batch of materials within 30 min. Two types of carriers were used to electrify the samples either with a negative charge or a positive charge. The difference between the two types of carriers lies in the surface polymer compositions of each of the surfaces.

The charge density Q/A was calculated using the following equation to compare the samples of different diameters.

$$Q/A = \frac{Q/M}{3 \cdot \frac{1}{d_0} \cdot \frac{1}{r_0}}$$

where:
Q/A is the charge density [$\mu C/m^2$],
Q/M is the charge-to-mass ratio [$\mu C/g$],
$d_0$ is the density of polymer [$g/m^3$],
$r_0$ is the radius of polymer [m].

The surface elemental composition and the electrical properties of the starting materials were continuously verified by XPS and measurement of Q/M.

The results of these experiments are discussed below.

2. RESULTS a) Plasma treatment of powders

Figure 2A:
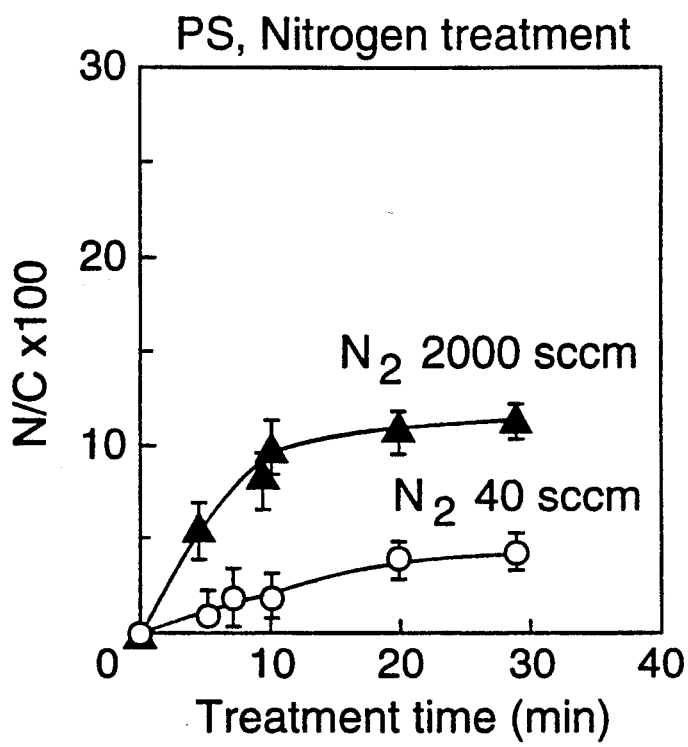
FIGS. 2(*a*) and (*b*) are graphs of the relationship between plasma treatment time and nitrogen, oxygen concentrations on PS powder.
Figure 2B:
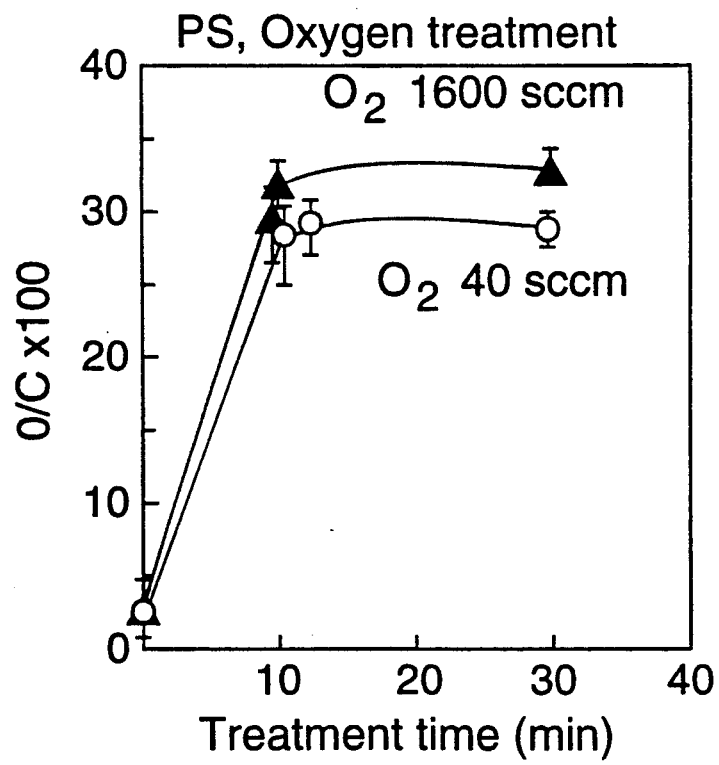

FIG. 2(a) shows the relationship between plasma exposure time and N/C on PS powder for nitrogen gas flow rates of 40 and 2000 sccm. N/C increased with treatment time, reaching a maximum of 12% after 20 min at 2000 sccm and 5% after 30 min at 40 sccm. FIG. 2(b) shows the relationship between the treatment time and O/C for PS powder using oxygen gas flow rates of 40 and 1600 sccm (the highest stable flow rate for oxygen gas). At 1600 sccm the O/C was seen to change from 0.03 to 0.34 within 10 minutes. Decreasing the gas flow rate to 40 sccm showed a similar reaction rate to that at 1600 sccm with a maximum O/C of 0.28 within 10 minutes. It thus appears that the oxygen plasma treatment is very efficient for PS powder.

Figure 3A:
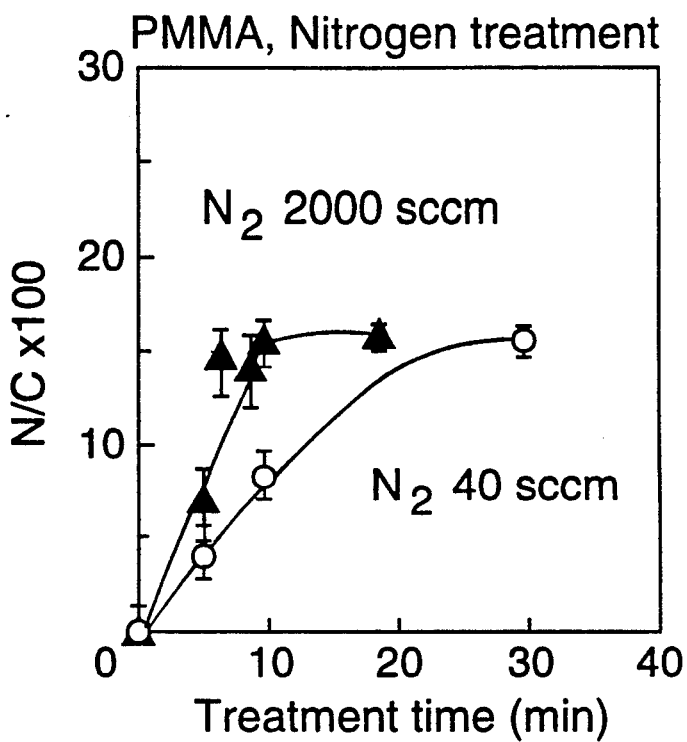
FIGS. 3(*a*) and (*b*) are graphs of the relationship between plasma treatment time and nitrogen, oxygen concentrations on PMMA powder.
Figure 3B:
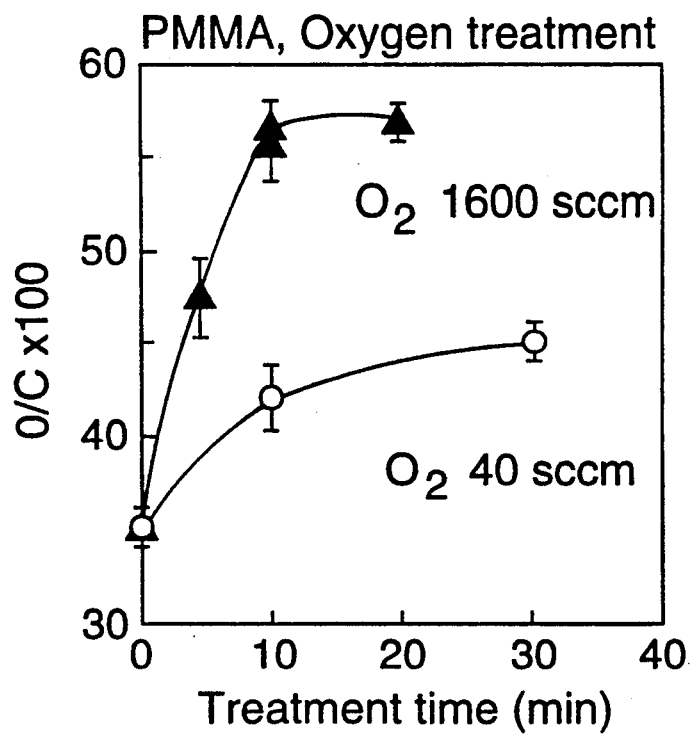

FIG. 3(a) shows the rate of reaction of a nitrogen plasma on PMMA powder. At 2000 sccm the maximum N/C was 0.15 after 10 minutes. Unlike PS, the rate of reaction was seen to change significantly with changes in flow rate. FIG. 3(b) shows that with oxygen plasma treatment, the O/C of PMMA changed from 0.35 to 0.56 within 10 minutes. Decreasing the flow rate to 40 sccm showed an increase in O/C from 0.35 to 0.45 after 30 minutes of exposure. For ease of comparison $\Delta$O/C will be used for PMMA, where $\Delta$O/C indicated O/C of treated PMMA minus O/C of untreated PMMA (O/C=0.35).

Figure 4A:
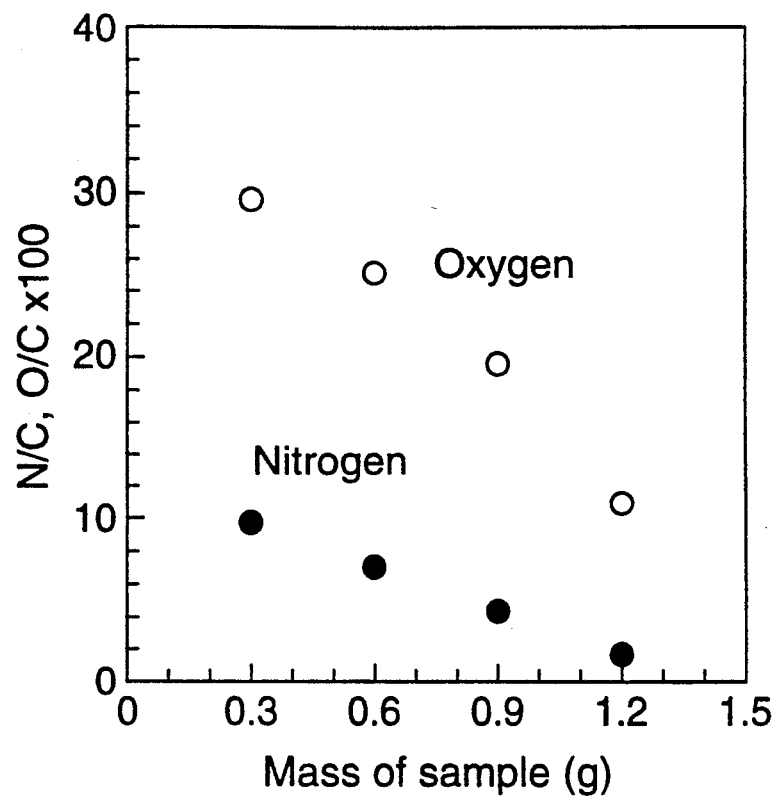
FIGS. 4(*a*) and (*b*) are graphs of the relationship between mass of a) PS and b) PMMA powders and the concentration of nitrogen and oxygen observed.
Figure 4B:
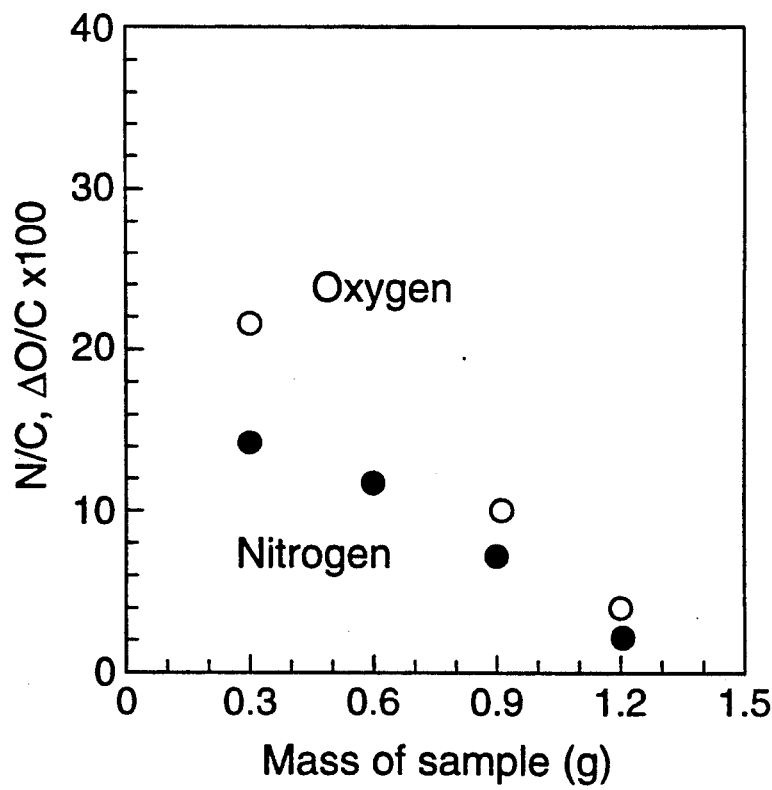

The mass of sample used during plasma treatment was changed to investigate the effects of the sample quantity in the reactor. FIGS. 4(a)(b) shows the relationship between mass of PS(a) and PMMA(b) powder and nitrogen or oxygen concentration. The treatment time was 10 min, using a high gas flow rate. When increasing the mass of samples in the reactor, N/C and O/C decreased for both polymers. These results show that less quantity of sample is more effective for achieving higher concentrations of nitrogen and oxygen.

Figure 5B:
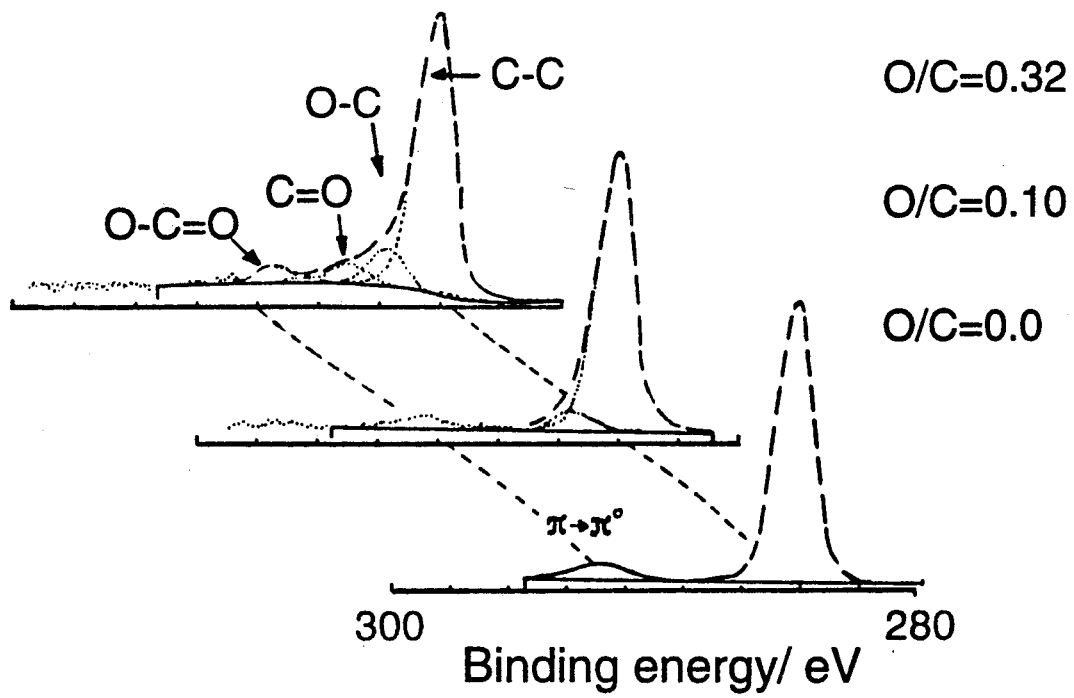
FIGS. 5 (*a*) and (*b*) are graphs of the C 1s spectra of a) nitrogen plasma treated PS and b) oxygen plasma treated PS powder.
Figure 5A:
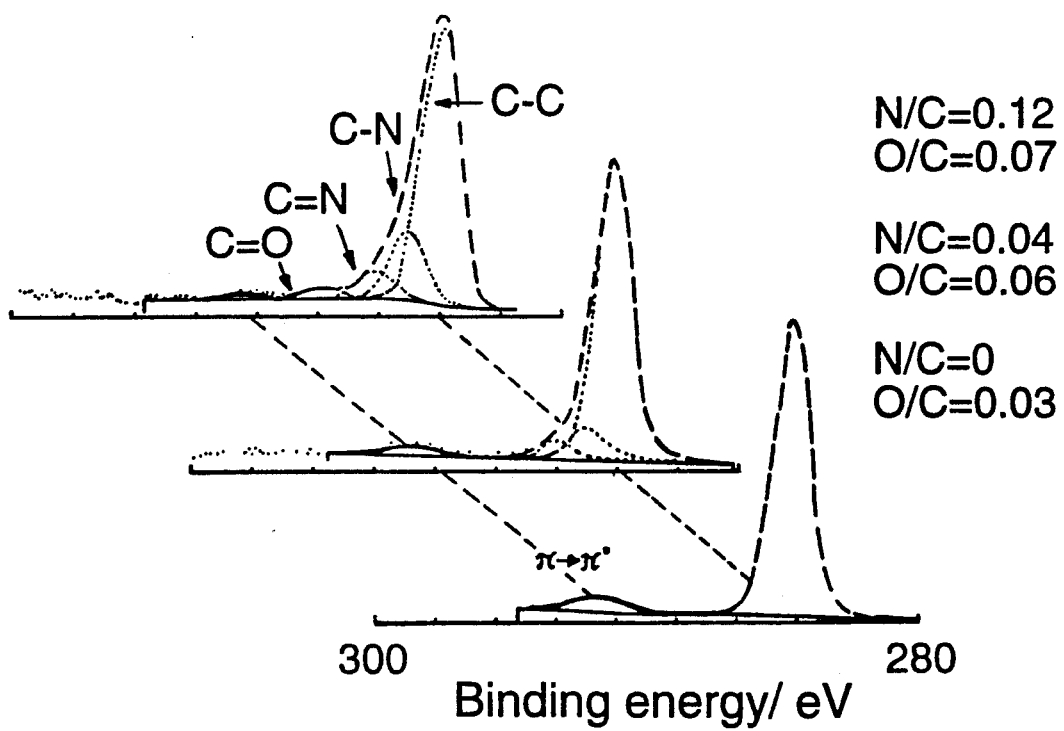

FIGS. 5(a)(b) shows the high resolution C1s peaks of PS powder with nitrogen and oxygen plasma treatment. The C1s peak for untreated PS powder was resolved into two components. The component of greatest intensity at a binding energy of 284.8 eV represents the hydrocarbon component. The feature shifted by 6.7 eV represents the $\pi \rightarrow \pi^*$ shake up satellite characteristic for aromatic or conjugated species (see D. T. Clark and A. Dilks, *J. Polym. Sci., Polym. Chem. Ed.* 14, 533 (1976)).

After exposure to a remote nitrogen plasma (N/C=0.04, O/C=0.06), the peak shape was seen to alter with the appearance of new functional groups (FIG. 5(a)). Since the binding energy shifts for these peaks are small (<2 eV), it is believed that the nitrogen adds to the polymer as amine functional groups (C—NH$_2$, C—NHR, C—NR$_2$) and imines (C=N). Oxygen appears to add as hydroxyl or ether groups (shift of 1.5 eV). With longer exposure time to a nitrogen plasma (N/C=0.12, O/C=0.07), the intensity of these peaks was seen to increase and a low intensity peak at a binding energy shift of 3.6 eV was observed suggesting the formation of C=O and RCO—NHR groups. A decrease in the $\pi \rightarrow \pi^*$ shake up satellite intensity was seen with remote nitrogen plasma treatment suggesting some disruption of the PS conjugated structure.

With exposure to a remote oxygen plasma (FIG. 5(b)) the C 1s peak shape of PS was seen to change and suggested the formation of hydroxyl groups (shift of 1.5 eV) and carbonyl groups (shift of 3.0 eV) at an O/C=0.10. With higher oxygen concentration (O/C=0.32), the spectrum was seen to change further with the appearance of additional peak components suggesting the formation of carboxyl groups (shift of 4.0-4.5 eV). It was also noted that the $\pi \rightarrow \pi^*$ shake up satellite disappeared with longer exposure to the plasma.

Figure 6B:
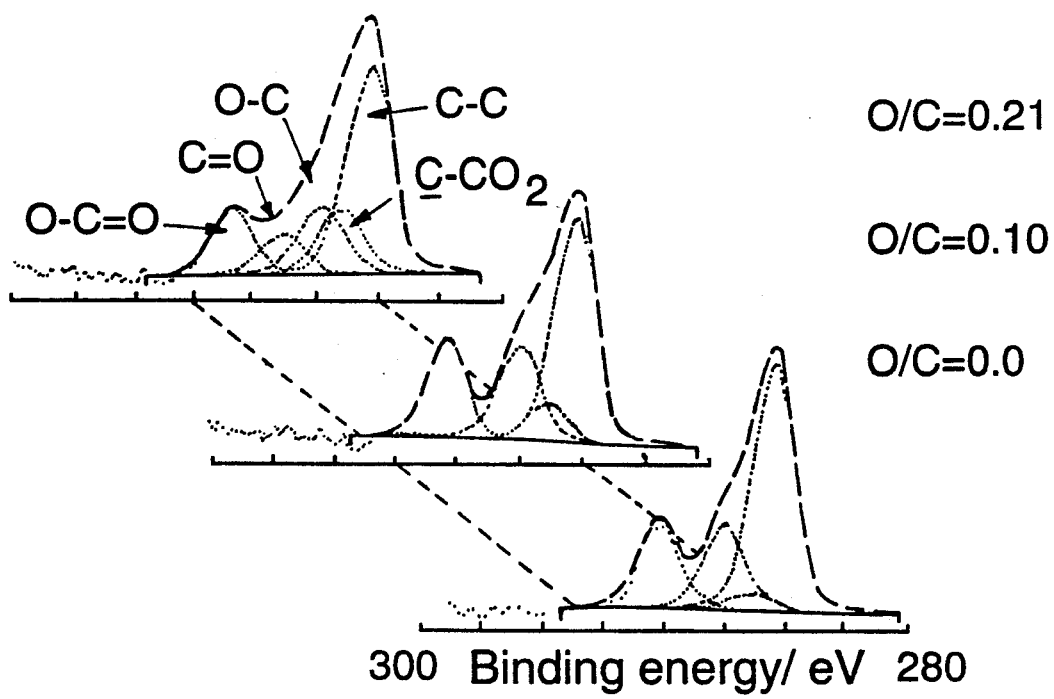
FIGS. 6(*a*) and (*b*) are graphs of the C 1s spectra of a) nitrogen plasma treated PS and b) oxygen plasma treated PMMA powder.
Figure 6A:
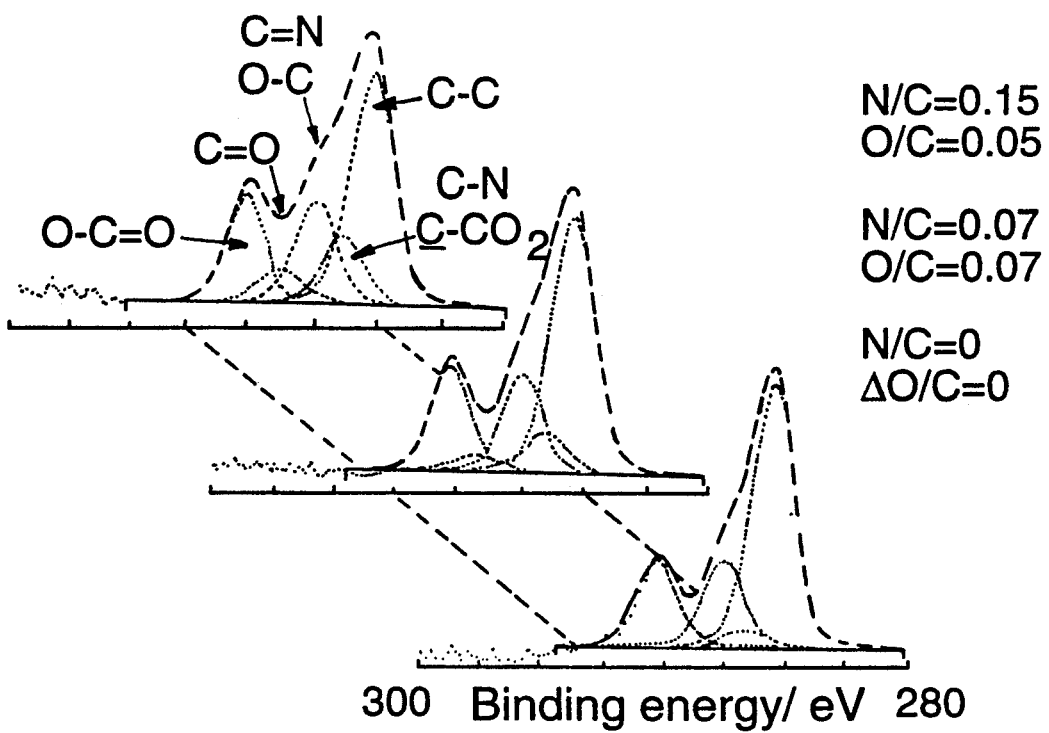

The C 1s peak for PMMA (FIGS. 6(a)(b) was also seen to change with plasma treatment. The original material showed four components within the peak envelope. These can be associated with the hydrocarbon component; C—CO$_2$ at a binding energy shift of 0.8 eV, C—O at a shift of 1.5 eV, and the ester carbon RO—C=O at 3.9 eV. With nitrogen plasma treatment (N/C=0.07, $\Delta$O/C=0.07), small changes are observed the C1s spectrum with an increase in the peaks at 3.9 eV and 0.8 eV and the appearance of a small feature at 3.0 eV (FIG. 6(a)). With further nitrogen plasma treatment (N/C=0.16, O/C=0.05), an increase in the intensity of all high binding energy peaks was observed. Since O/C did not change, it can be assumed that this represents the formation of further nitrogen functional groups such as amines (0.8 eV), amides (3.0 eV), and urea type functional groups (4.0-4.5 eV) on the surface [see D. T. Clark and A. Harrison, *J. Polym. Sci., Polym. Chem. Ed.* 19, 1945 (1981)].

With oxygen plasma treatment of PMMA, similar changes in the C 1s envelope were observed (FIG. 6(b)). After a change in O/C of 0.10, the original peak shape changed significantly, with an intensity increase of the C—O (shift of 1.5 eV) and RO—C=O (shift of 3.9 eV) components. With longer exposure times ($\Delta$O/C=0.22) an extra feature appeared at 3.0 eV indicating the formation of C=O groups on the surface. This appeared to be accompanied by an intensity decrease of the C—O and RO—C=O groups, which may suggest disruption of the PMMA polymer structure.

b) Electrical characteristics

Figure 7A:
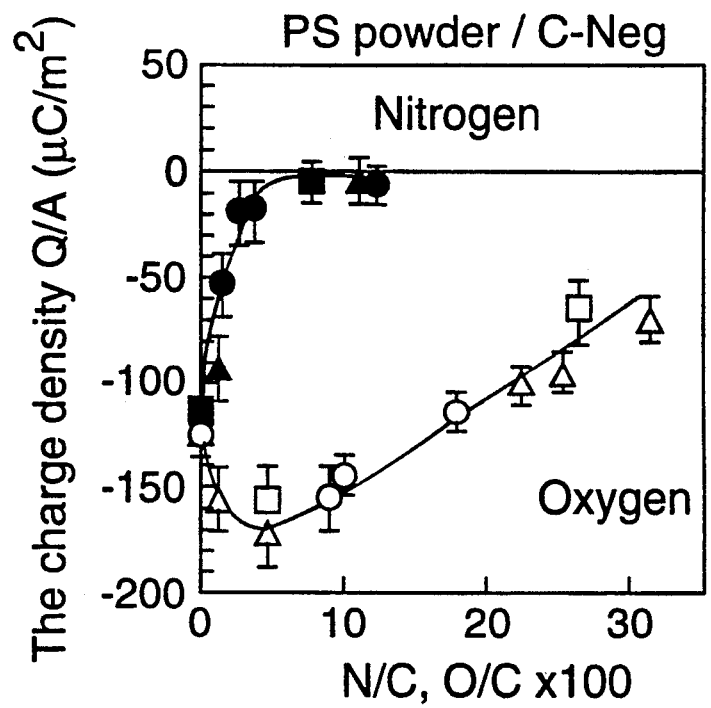
FIGS. 7(*a*) and (*b*) are graphs of the relationship between Q/A versus N/C and O/C for PS powder electrified with a) negative carrier and b) positive carrier.
Figure 7B:
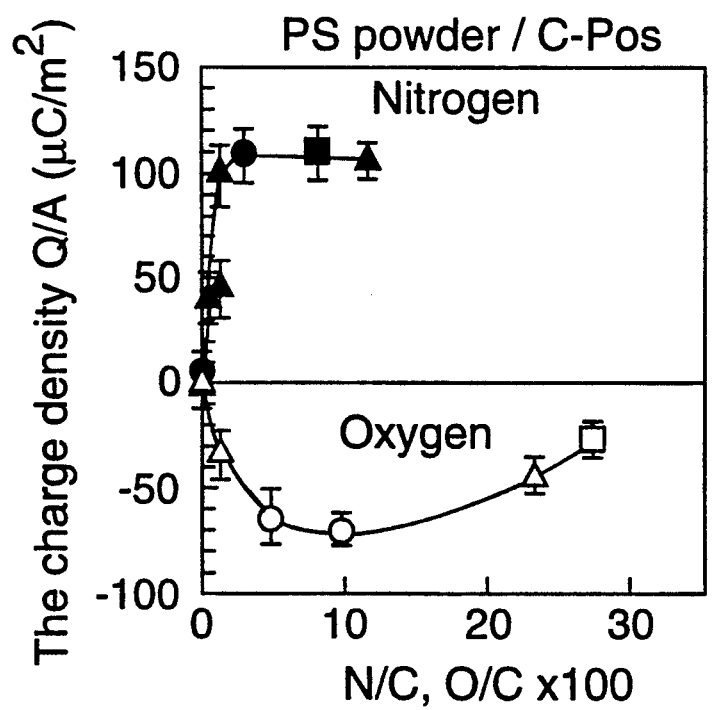

Polystyrene:

FIG. 7(a) shows the relationship between the relative concentration of nitrogen (N/C) or oxygen (O/C) and the charge density (Q/A) on the PS powder electrified using a negative carrier. Powder samples of diameter 8 $\mu$m ($\Delta$), 15 $\mu$m ($\square$), and 20 $\mu$m ($\bigcirc$) were used. Since all measured points fit on the same curve it is evident that the charge density is independent of the diameter of the powder. Untreated PS powder showed a Q/A of about $-120$ $\mu C/m^2$. Even after very brief nitrogen plasma treatment a significant change towards positive charge was observed. Q/A reached a maximum (0 $\mu C/m^2$) when XPS indicated N/C to be 0.08-0.09. No further change in Q/A was observed with higher nitrogen content. This effect was found to be even more rapid when a positive carrier was used (FIG. 7(b)). Untreated PS powder did not accumulate charge when in contact with the positive carrier (Q/A=0 $\mu C/m^2$). However, after nitrogen plasma treatment to N/C=0.02, Q/A shifted toward a maximum positive charge of +110 $\mu C/m^2$. The difference in Q/A before and after nitrogen plasma treatment, $\Delta Q/A$, was similar for both negative and positive carriers, but the effect of low nitrogen surface concentrations was much more pronounced with a positive carrier.

In contrast to the changes caused by the nitrogen plasma treatments, oxygen plasma treatment of polystyrene resulted in markedly different charging behaviour. In FIG. 1 electrification of oxygen plasma treated PS with a negative carrier caused its Q/A to decrease under conditions where the surface oxygen content is relatively low. However, with higher oxygen concentrations a minimum in Q/A is reached. Then, at still higher oxygen concentrations (O/C=0.1) the Q/A increases. Electrification of oxygen plasma treated PS particles with a positive carrier was found to respond to oxygen surface concentrations in a manner qualitatively similar to electrification with a negative carrier.

Figure 8A:
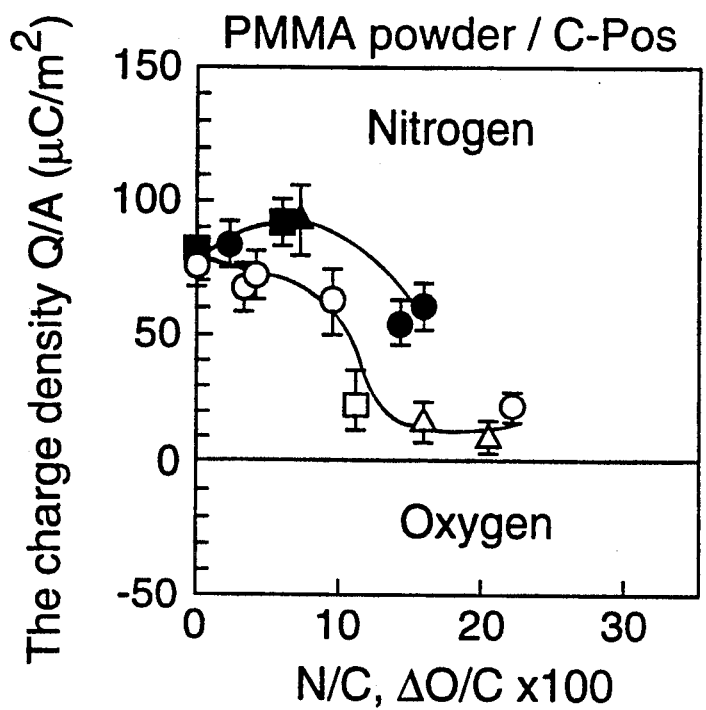
FIGS. 8(*a*) and (*b*) are graphs of the relationship between Q/A versus N/C and O/C for PMMA powder electrified with a) negative and b) positive carrier.
Figure 8B:
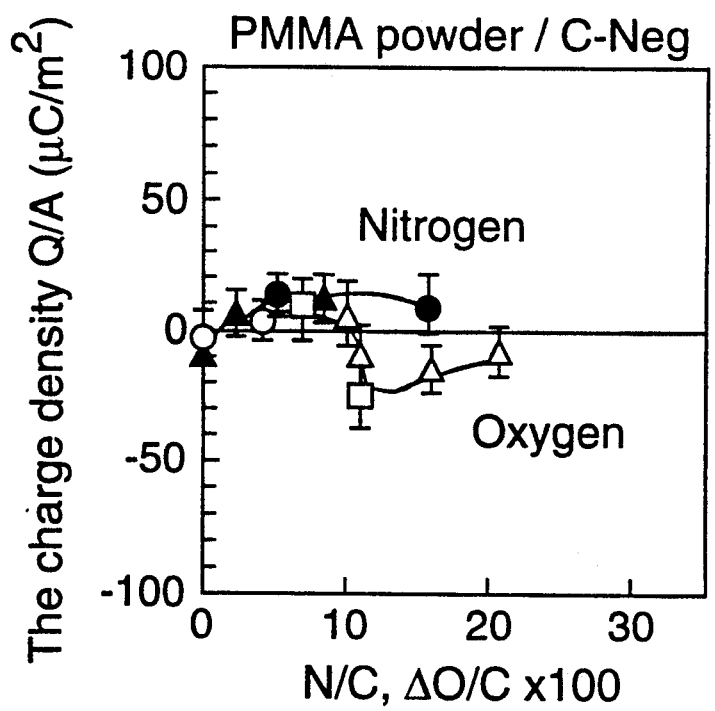

Polymethylmethacrylate:

Similar experiments using PMMA powder showed a very different behaviour than that of PS. FIGS. 8(a)(b) show the relationships between the N/C or $\Delta O/C$ and the Q/A of PMMA, electrified by negative (a) and positive (b) carriers. In this graph again several powder diameters were plotted together (diameter 8, 12, 20 $\mu m$). The value of Q/M of untreated PMMA was found to be about +85 $\mu C/m^2$ using a positive carrier. Q/A was found to increase only slightly (+100 $\mu C/m^2$) for low nitrogen concentration (N/C<0.07) and then actually decreased with higher values of N/C. Q/M decreased with an increase in $\Delta O/C$. A very rapid change in Q/A was observed near $\Delta O/C=0.10$ for both carriers suggesting significant changes in the surface properties at that point.

The data observed for PMMA in fact showed no resemblance to that of PS suggesting very different charging mechanisms for the two polymers.

c) Surface aging

Figure 9:
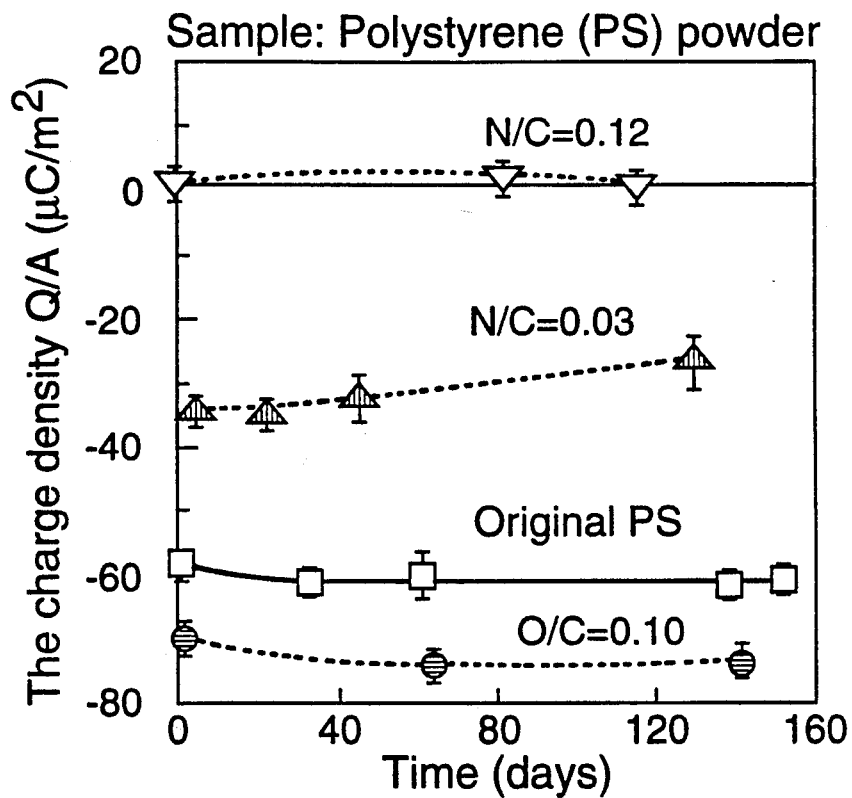
FIG. 9 is a graph of the change in Q/A on nitrogen plasma treated PS powder as a function of time.
Figure 10:
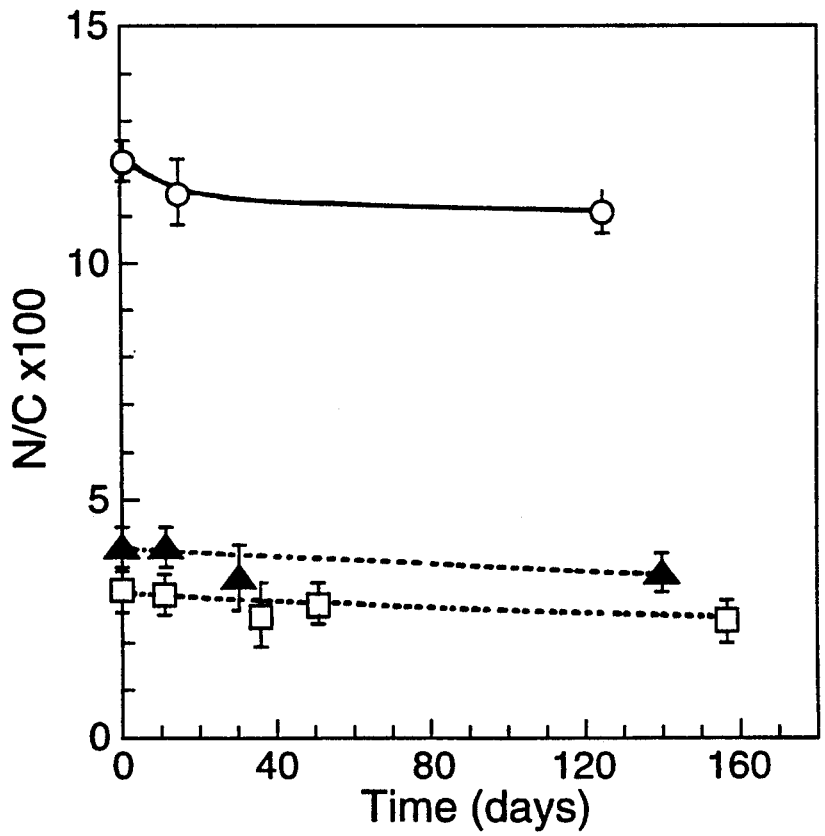
FIG. 10 is a graph of the change in N/C on nitrogen plasma treated PS powder as a function of time.

Q/A on the plasma treated PS and PMMA was measured for several weeks after the plasma treatment in order to investigate the effect of aging on the ability of the particle to accumulate charge. FIG. 9 shows the change in Q/A for PS powder using negative carrier. For high nitrogen concentration (N/C=0.12) Q/A did not appear to change over a period of 120 days. For low nitrogen concentration PS (N/C=0.03) Q/A actually increased to a more positive value (20%) over 130 days. The Q/A of oxygen plasma treatment PS was seen to decrease to a more negative value (about 2-5%) over 140 days. The concentration of nitrogen (N/C) on the PS and PMMA was also measured for several weeks after the plasma treatment to investigate the aging phenomenon. FIG. 10 shows the change in the N/C ratio on PS powder as a function of time. The nitrogen concentration was seen to remain within experimental error over the 120 days for samples with low surface nitrogen concentrations. These results suggest that while the concentration of oxygen and nitrogen changes slightly with time, the surfaces retain their electrical properties.

d) Photoemission Studies

Figure 11A:
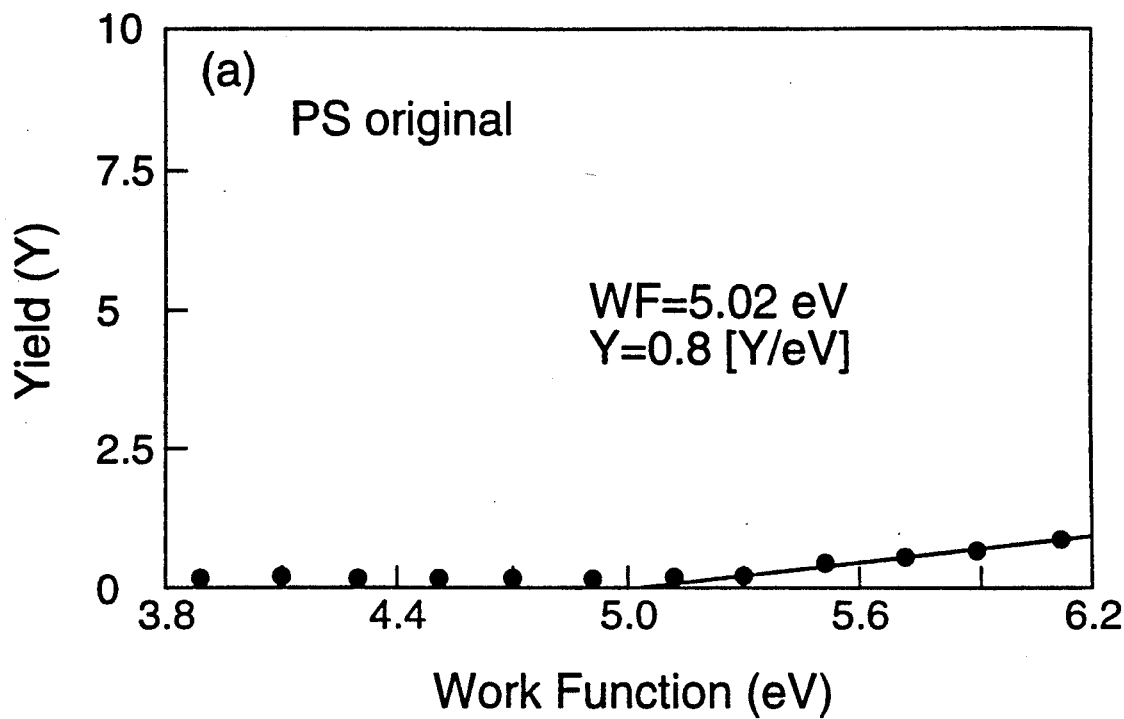
FIGS. 11(*a*) and (*b*) are comparisons of the photoelectron yields of nitrogen-treated and untreated polystyrene.
Figure 11B:
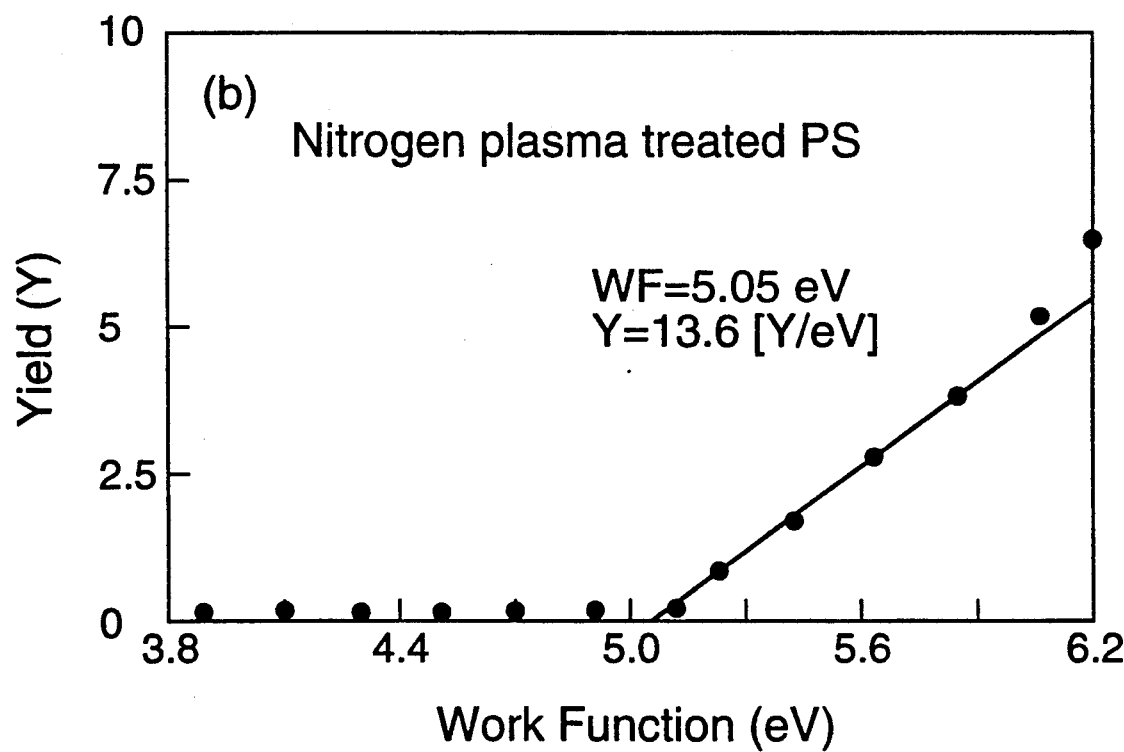

The photoelectron yields of nitrogen-treated and untreated polystyrene have been measured using a dedicated instrument. In FIGS. 11(a) and 11(b), the photoelectron yields are compared. Both samples have work functions close to 5.05 eV, but the electron yields above this energy is greater than ten times higher for the nitrogen-treated surface.

e) Effect of Indium

Other elements have also been found to affect the charging properties of polystyrene when introduced in low concentrations into the surface. For example, indium added to the surface in quantities of 1 atomic % caused the Q/A to increase to similar values as was found for nitrogen.

Figure 12:
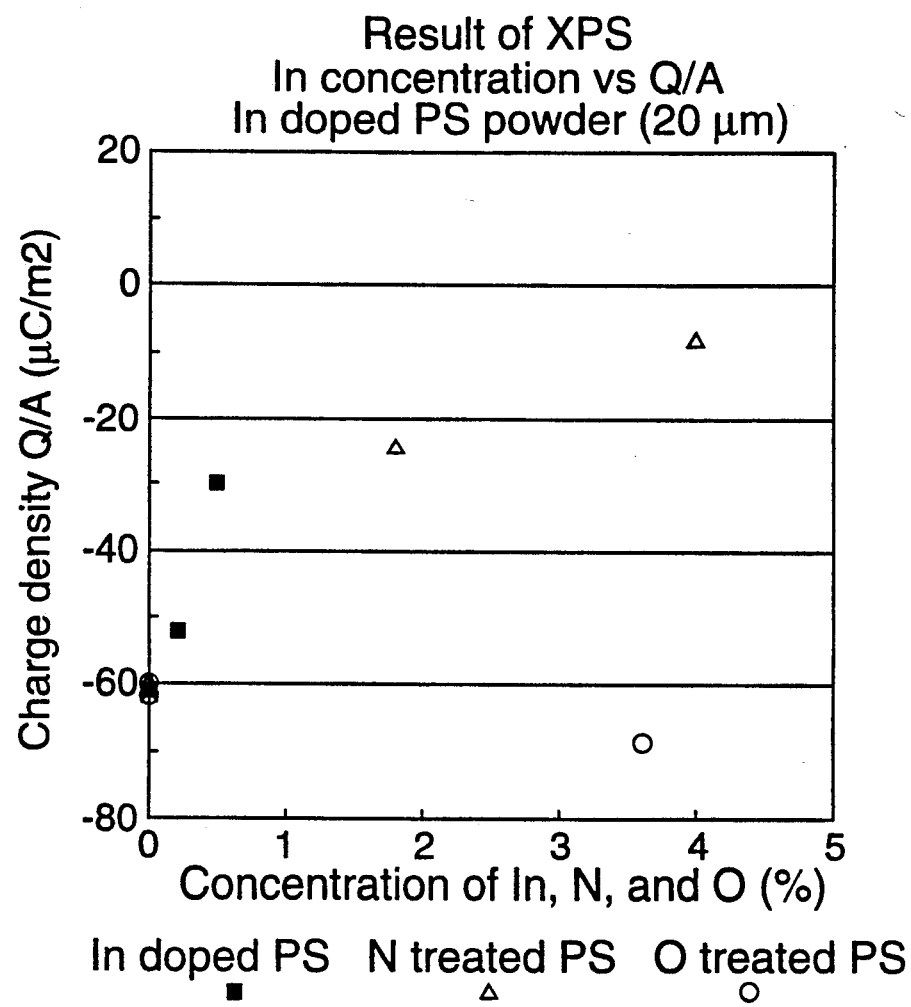
FIG. 12 is a graph of changes in Q/A for PS bombarded with In during In/Ar plasma treatment.

Indium as a metal foil was suspended in the gas flow just below the microwave cavity. A gas flow of 1000 sccm was used to transfer indium vapor to the surface of polystyrene particles in the normal place in the reactor shown in FIG. 1. XPS showed that a small concentration of indium was present on the surface as $In^{+3}$. The presence on the surface of low concentrations of indium caused a major increase in the electrical charge retained, as shown in FIG. 12.

3. DISCUSSION

These results have shown that, by using a downstream nitrogen plasma, it is possible to make major and long-lasting changes to the triboelectric properties of PS powder. Q/A measurements of nitrogen plasma-treated PS have shown dramatic changes in charging properties with very low incorporation of nitrogen into PS. In order to understand this phenomenon, Q/A data must be carefully compared to the available XPS data. XPS analysis has suggested that during nitrogen plasma treatment the major species formed are amines, even at higher N/C (FIG. 5(a)). Q/A measurements have shown a very rapid shift towards positive charge during the initial stages of nitrogen incorporation. The charge reaches a plateau well before the surface amine concentration has reached its maximum. The effect is particularly marked when using a positive carrier for electrification.

Figure 13:
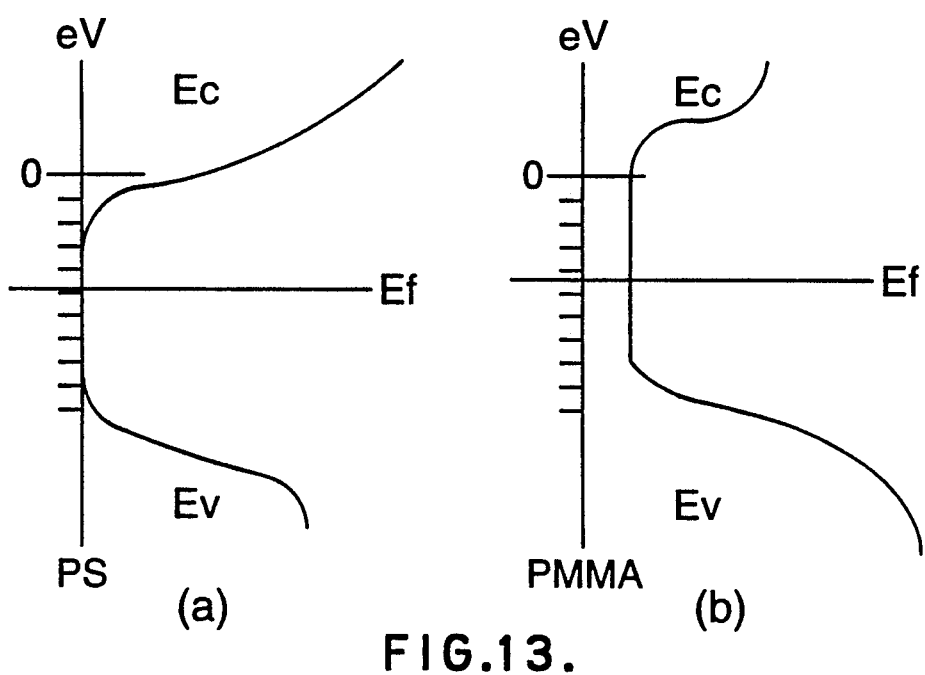
FIGS. 13(*a*) and (*b*) are energy band diagrams for untreated a) PS and b) PMMA.
Figure 14A:
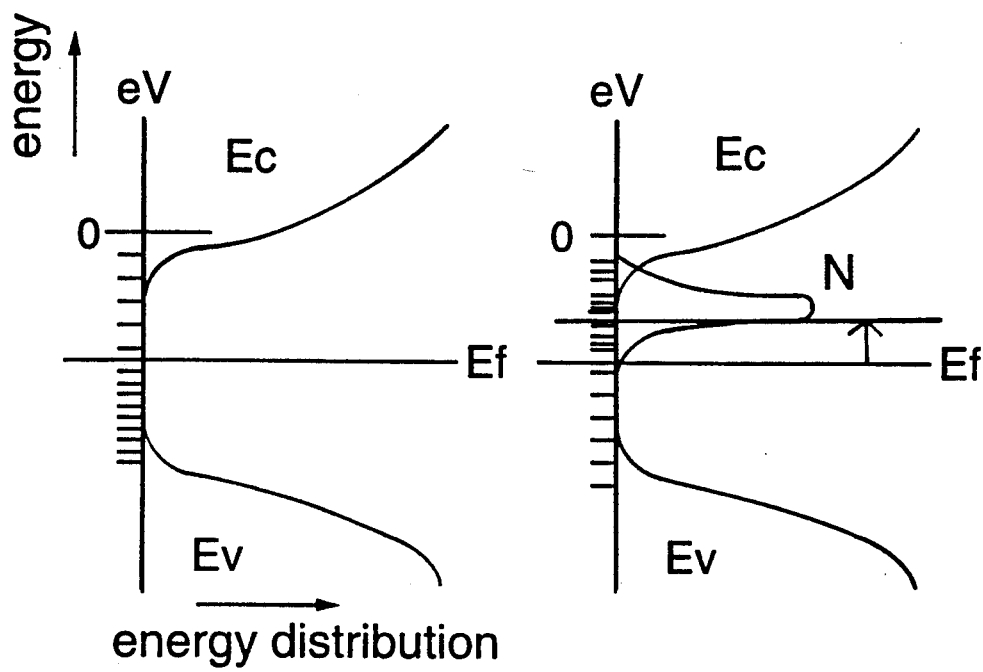
FIGS. 14(*a*) and (*b*) are energy band diagrams of a) nitrogen plasma and b) oxygen plasma treated PS.

This has led the inventors to believe that the change in Q/A is not entirely controlled by surface chemistry and interfacial adhesion forces, but may also be affected by changes in the surface electronic properties. Polystyrene, on the basis of calculations of band gap [see C. B. Duke and T. J. Fabish, *J. Appl. Phys.* 49,315 (1979)], is believed to have few surface states near its Fermi level (FIGS. 13 (a)(b)). A small concentration of nitrogen (N/C<0.03), acting as a donor, could create additional unoccupied surface states in this region (FIG. 14(a)) which may stabilize charges. The effect of the nitrogen on the photoemission yield provides evidence for an alteration of electronic band structure. The differences in the effectiveness of positive and negative carriers may, however, be governed by surface chemistry. For a positive carrier even low concentrations of nitrogen impart the maximum effect on the Q/A of polystyrene particles. The less dramatic effect achieved with the negative particle may be due to a difficulty in achieving good contact between carrier and toner until the toner surface has sufficient hydrophylicity brought about by extensive nitrogen treatment.

XPS results have shown that the main structure of PS has remained, even at high nitrogen concentration, but with some loss of aromatic character. Loss of the conjugated structure could alter significantly the charging properties by altering the density of occupied and unoccupied states.

Figure 14B:
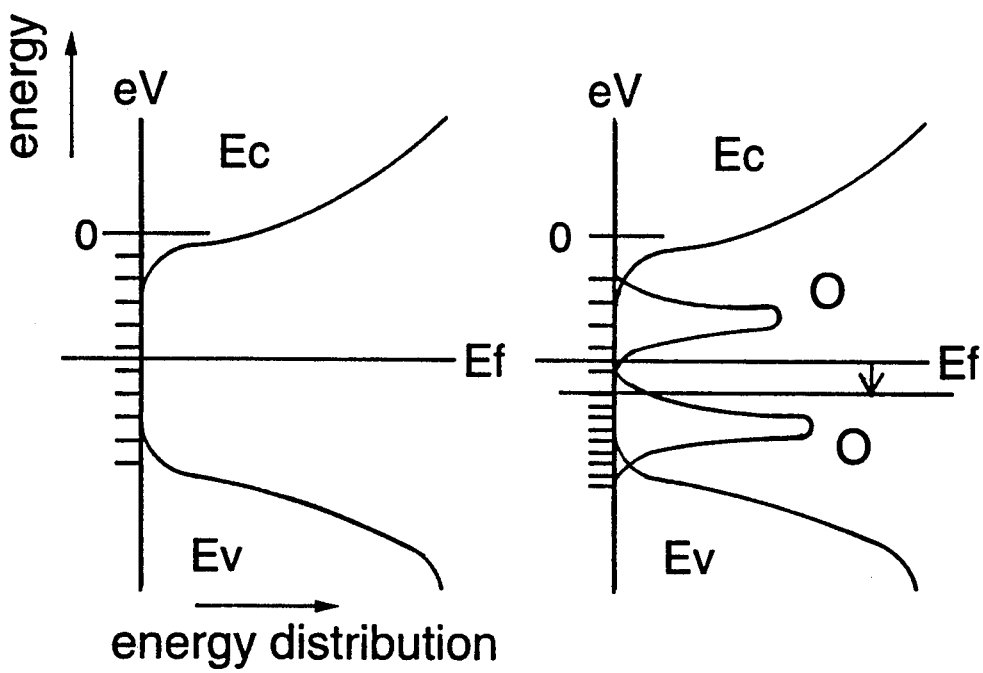

Oxygen plasma treatment results for PS suggest that rather different mechanisms are involved. Q/A increased towards a small negative charge at low O/C and slowly decreased towards positive charge at O/C>0.05 or 0.10 for negative and positive carriers respectively. The oxygen added may create both occupied and unoccupied surface states which could change the Fermi level (FIG. 14(b)).

In contrast to PS, PMMA has many surface states in the band gap. The two band gaps are compared in FIG. 13. The band gap states are therefore less sensitive to the addition of potential donor atoms such as nitrogen. The effect of nitrogen addition on Q/A for PMMA may only be the result of changes in surface charging. The change of Q/A on the oxygen plasma-treated PMMA is also much less than that for PS. A rapid change near O/C=0.10 of Q/A on oxygen plasma-treatment PMMA may be caused by the disruption of the PMMA polymer structure (FIG. 6(b)).

In conclusion, the surfaces of PS and PMMA powders were modified by treating them with downstream nitrogen and oxygen plasmas. Q/A of nitrogen plasma-treated PS powder has shown a very rapid change towards positive charge with small increases in N/C. It is believed that nitrogen atoms could act as a donor and increase the unoccupied surface states in the surface of PS. The variation of Q/A of PMMA has been much less than that of PS, perhaps because of the larger number of surface states in the band gap.

We claim:

1. A method of improving the triboelectric properties of polymer powder, comprising the step of positioning said polymer powder in the afterglow region of a gas plasma having a main region and an afterglow region, where said gas plasma is in a low-pressure stream of a gas selected from the group consisting of oxygen, nitrogen, and gases containing oxygen or nitrogen, whereby low concentrations of oxygen or nitrogen as the case may be are incorporated into the surface of the powder.

2. A method as recited in claim 1, where said polymer powder is of any conjugated polymer.

3. A method as recited in claim 1, where said polymer powder is of any polymer bearing aromatic constituents.

4. A method as recited in claim 1, in which said gas is nitrogen, and in which said polymer is selected from the group consisting of polystyrene and co-polymers of polystyrene.

5. A method of improving the triboelectric properties of polymer powder, comprising the step of positioning said polymer powder in the afterglow region of a gas plasma having a main region and an afterglow region, where said gas plasma is in a low-pressure stream of a gas selected from the group consisting of oxygen, nitrogen, and gases containing oxygen or nitrogen, and where indium as a metal foil is suspended in said gas stream adjacent said gas plasma, thereby generating indium vapour, whereby low concentrations of indium are incorporated into the surface of the powder.

* * * * *